Aug. 4, 1970  M. O'BRIEN  3,522,735
RANDOM SAMPLER FOR FRUIT AND THE LIKE
Filed Jan. 14, 1969  3 Sheets-Sheet 1

INVENTOR.
MICHAEL O'BRIEN
BY
Lothrop & West
ATTORNEYS

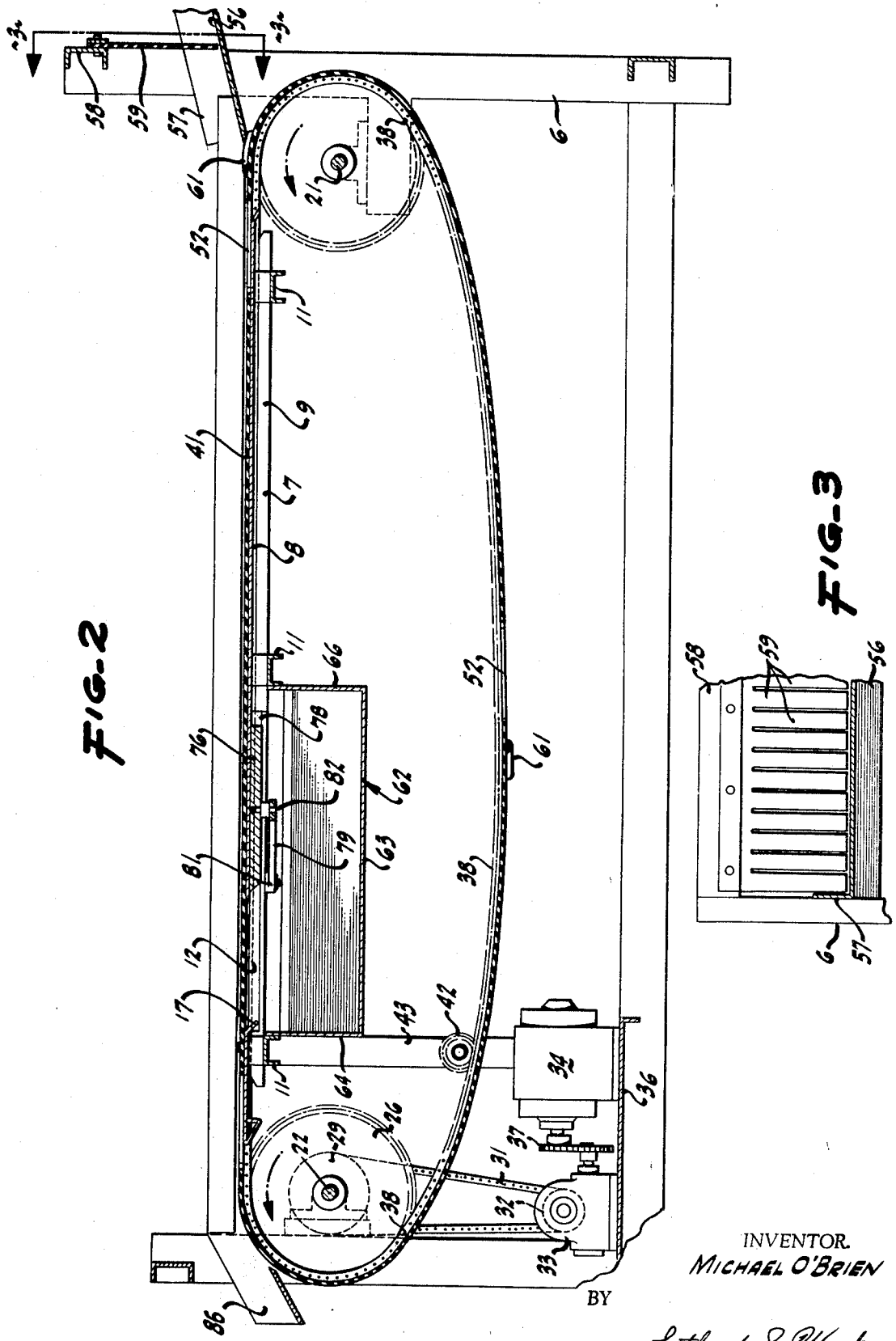

United States Patent Office 3,522,735
Patented Aug. 4, 1970

3,522,735
RANDOM SAMPLER FOR FRUIT AND THE LIKE
Michael O'Brien, Davis, Calif., assignor to The Regents of the University of California, Berkeley, Calif.
Filed Jan. 14, 1969, Ser. No. 791,054
Int. Cl. G01n 1/02
U.S. Cl. 73—421                                        5 Claims

ABSTRACT OF THE DISCLOSURE

A random sampler for fruit and the like has a conveyor belt web on a frame with a flat, horizontal, upper run of the belt web supported on a subjacent horizontal table on the frame extending from a loading location to a sampling location. The table has an opening over which the belt passes. The belt has one or more trap doors therein defined on three sides by cuts through the conveyor belt web. The trap doors are supported in closed position by and on the table but open downwardly when above the table opening so as to let fruit or the like previously supported thereon fall through the trap door or doors and the table opening.

---

In the handling of fruit, vegetables and like commodities, referred to herein as fruit, it is now customary to decide the routing of the fruit; that is either to the packing house or for discard, and it is also customary to determine the amount to be paid for the fruit depending on its grade just as soon as possible after the fruit is gathered to save further handling or to establish the nature of further handling and payment.

It is also customary in many operations now to handle the fruit in relatively large bins. Various samplers have been heretofore provided for determining the nature or grade of the fruit. It is, of course, quite important that the sample chosen for determining the nature of the entire bulk be a fairly and accurately chosen sample and that it be taken completely at random in order to avoid favoritism in any direction and in order to make sure that the sample is truly representative. Although some of the previous samplers have served well in this connection, they operate intermittently and so sometimes have been relatively slow. They have involved a good deal of handling and have not been well adapted for taking care of a very large quantity of fruit within a reasonable time and at a low cost or on a continuous basis.

It is therefore an object of this invention to provide a random sampler for fruit effective to provide random samples from a large flow of fruit continually passing through the device.

Another object of the invention is to provide a sampling mechanism effective to provide a completely random sample.

Another object of the invention is to provide a random sampler appropriate for use with fruit normally handled in relatively large bulk bins.

A further object of the invention in general to provide a random sampler.

Other objects together with the foregoing are attained in the form of invention described in the accompanying description and illustrated in the accompanying drawings, in which:

FIG. 2 is a cross-section, the plane of which is indicated by the line 2—2 of FIG. 1;

FIG. 3 is a detail showing in elevation a portion of the entrance to the machine, the plane of the view being indicated by the line 3—3 of FIG. 2;

Figure 1:
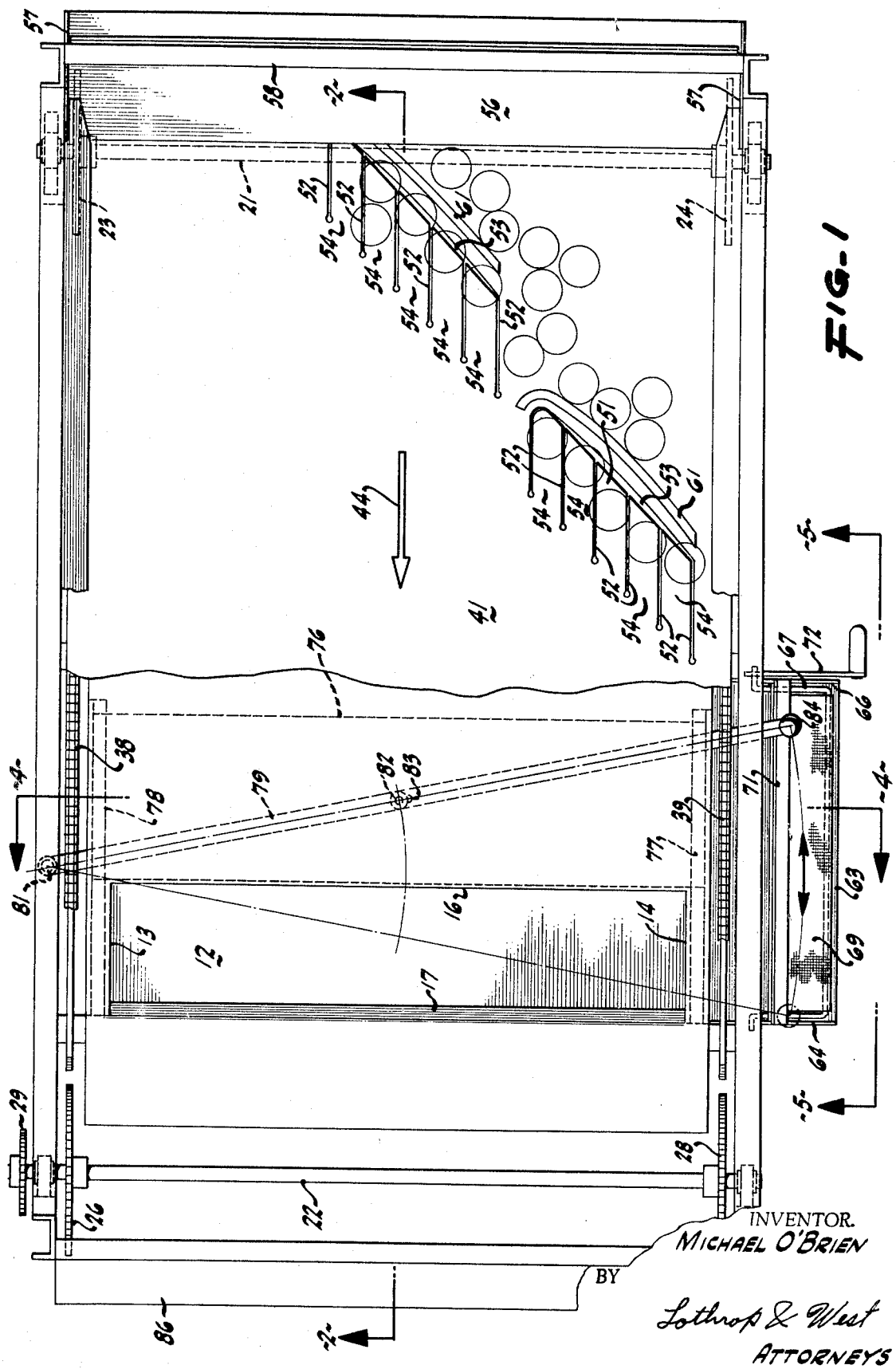
FIG. 1 is a plan of a random sampler constructed pursuant to the invention.

In its preferred form, the random sampler is designed for quick setting up in a packing house or in the field or at any point convenient for examination and sampling of the fruit being handled. The device includes a main frame 6 comprised of various uprights and cross members to afford a substantially rectangular framework. Included in the framework is a suitable mechanism for supporting a generally planar, horizontally extending table 7.

A preferred table construction includes a metallic upper layer 8 supported by a subjacent stiffening member 9 and appropriate cross members 11. The horizontal table is generally rectangular in plan and is smooth and continuous except that near one end it is provided with a relatively large rectangular opening 12. On opposite sides the opening is defined by longitudinally extending margins 13 and 14, is defined along an upstream side by a transverse margin 16 and is defined on a downstream side by an inclined transverse margin 17 preferably provided by a downturned portion of the metallic layer 8.

Mounted on the frame 6 are transverse shafts 21 and 22 carrying a pair of sprockets 23 and 24 at one end and a similar pair of sprockets 26 and 28 at the other end. The shaft 22 is extended to carry a sprocket 29 connected by a chain 31 to a sprocket 32 on a speed reducer 33. An electric motor 34 is mounted on a frame platform 36 likewise carrying the speed reducer 33 and is connected thereto by gearing 37.

Trained around the sprockets 23 and 26 is a side conveyor chain 38 and trained around the sprockets 24 and 28 is another side conveyor chain 39. With this arrangement, when the motor 34 is energized the chain 31 drives the shaft 22 and through the chains 38 and 39 likewise drives the shaft 21.

Pursuant to the invention, the chains 38 and 39 are joined by a conveyor belt 41. In most installations the conveyor belt is comprised of rubberized canvas, although other materials can be utilized should there be contamination and sanitary problems. In any event, the conveyor belt 41 is an endless loop or web of generally flexible and tough material. At its margins the belt 41 is joined to the chains 38 and 39 and is arranged to be trained around the sprockets 23 and 24 at one end and the sprockets 26 and 28 at the other end. This disposes the belt with its upper run lying flatly on the metal surface 8 of the table 7. The lower run of the belt conveyor 41 droops in a natural curve, although its position can be adjusted somewhat by idler sprockets 42 on uprights 43 included in the frame 6 to make sure that the belt and chains do not snap or whip. When the motor 34 is energized, the conveyor 41 is advanced along with the chains in a direction of advance of the upper run as indicated by the arrow 44 in FIG. 1.

The belt conveyor is not completely uniform throughout but pursuant to the invention is particularly provided with a number of trap doors arranged in predetermined positions in order to afford suitable random samples. As especially illustrated in FIGS. 1 and 2, the otherwise continuous web or run of the conveyor belt is at appropriate intervals interrupted to provide trap doors 51. Each trap door is made by providing a number of longitudinal cuts 52 entirely through the material of the belt and also by providing a transverse cut 53 from one side to the other of the trap door. The longitudinal cuts and the transverse cut are preferably inclined or made diagonally with respect to the direction of advance 44. All of the various cuts 52 and 53 considered together can be thought of as defining the boundaries of the trap door, and the individual cuts 52 and the transverse cut 53 can likewise be considered as providing a number of tabs 54, several of which (in the present instance, five) together make up the complete trap door.

In the operation of the mechanism as so far described, when the motor 34 is energized and the belt conveyor is travelling from right to left in FIGS. 1 and 2, the operator provides a continuous supply of fruit to an entrance conveyor 56 inclined downwardly and terminating just above the center of the shaft 21. The conveyor 56 has appropriate side edges 57 to confine the fruit thereon. An upward extension of the frame 6 has a cross member 58 with a number of downwardly depending straps 59 of flexible nature so that fruit travelling down the conveyor 56 by gravity tends somewhat to be slowed, distributed and leveled. In this way a reasonably uniform layer of fruit is deposited on the upper run of the conveyor 41.

Some of the fruit is poised above the imperforate portion of the conveyor and is carried along thereby through the machine. Other pieces of the fruit, completely at random, happen to land on or rest on the tabs 54 making up the trap of the trap door 51. The fruit continues in the direction of the arrow 44 as long as the underlying table 7 is continuous and provides a support, but as the individual trap doors 51 advance over the opening 12 in the table there is no longer any support from below for the fruit resting on the tabs 54.

As the individual tabs 54 advance over the edge 16, their own weight and the weight of the fruit resting thereon is sufficient to flex the individual tabs 54 downwardly into the opening 12, thus permitting gravital discharge of the fruit from the belt. This is a sequential operation at each trap door due to the angularity of the tabs. Only the fruit which is resting on the particular tabs unsupported at the time is discharged. The down-turned trap doors, having released their fruit, then ride over the inclined margin 17 of the opening as the belt continues to advance and are thus restored to their original position substantially coplanar with the remainder of the upper run of the belt. The belt trap doors then continue around the lower run of the conveyor to their initial receiving position adjacent the outlet of the conveyor 56 for further service.

To make sure that fruit which is merely near the trap door but is not actually resting on the individual tabs 54 is not sampled or released, I preferably provide on the upper surface of the belt and upstream of the trap door an upstanding barrier 61 conveniently of a readily flexible material such as rubber. In the present instance the barrier is a slightly curved and hooked dam-like projection rising above the surface of the belt. The barrier is high enough to preclude inadvertent falling in or rolling in of the following fruit on the upper belt run when the trap door tabs 54 flex into the opening 12. The rubber dam or barrier 61, although somewhat yielding, likewise acts as a stiffener for the margin of the conveyor opening and assists in repositioning the conveyor run if it tends to sag slightly in moving over the opening 12.

Figure 4:
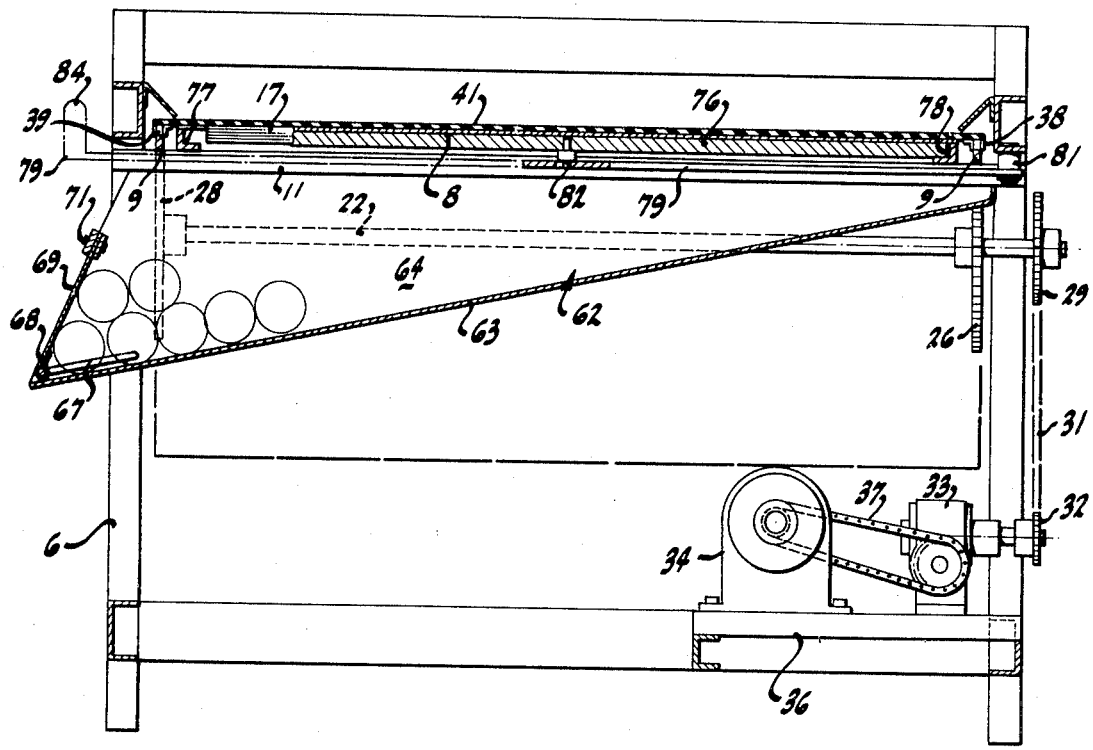
FIG. 4 is a cross-section, the plane of which is indicated by the line 4—4 of FIG. 1.
Figure 5:
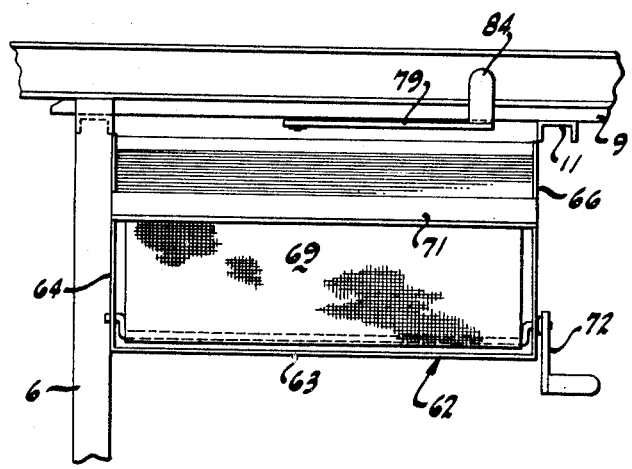
FIG. 5 is a partial side elevation, the plane of the view being indicated by the line 5—5 of FIG. 1.

Fruit discharged through the trap doors 51 and through the opening 12 is conveniently received in a sample bin 62. This partial enclosure is mounted on the frame 6 and includes an inclined floor 63 and appropriate sides 64 and 66. Fruit falling therein tends to roll by gravity to the left end, as seen in FIG. 4, where it is confined temporarily by a relatively heavy bail 67. At its opposite cranked ends the bail is pivotally supported in the side walls 64 and 66, and at its lower cranked portion lies within a loop 68 of a fabric door 69 secured or clamped in a cross bar 71 spanning the sides 64 and 66. Conveniently, one end of the bail 67 carries a hand crank 72.

In ordinary operation, the weight of the bail and of the hand crank is sufficient to keep the canvas door 69 relatively taut and to restrain the fruit which has rolled down the incline 63. When the inspector wishes to take a sample he merely lifts the handle 72, thus buckling the canvas 69 and permitting the previously restrained fruit to roll out either into his hand or into a sampling container. Following discharge of the requisite amount of fruit, the handle 72 can be dropped and the weight of the handle and bail will restore the door 69 to its restraining condition.

It is sometimes desired to vary the amount of the sample taken at any one time. That is accomplished by providing a slide 76 just beneath the metal top 8 of the table, the slide being confined in side guides 77 and 78 (FIG. 4) and in effect being a continuation of the table top 9 just below the metal portion. The slide is regulated by a cross lever 79 having one end provided with a pivot 81 on part of the frame 6 and being connected by a pivot 82 operating in a slot 83 in the nether side of the slide 76. The extended end of the lever 79 carries a handle 84 for ready manual operation. The slide can be positioned in its maximum open position, as shown in FIGS. 1 and 2, thus allowing maximum sampling. Alternatively, the slide can be moved completely closed with the bevel edge of the slide 76 abutting the margin 17. The table top is then substantially continuous and no sampling whatsoever occurs. The slide can also be adjusted to any appropriate intermediate position so that the sampling can be as extensive as desired.

Fruit which does not fall through the trap doors and on into the sample bin 62 simply discharges from the conveyor belt as the belt rounds the downstream end of the table onto a discharge conveyor 86 delivering either to a bulk bin or to other mechanism for further handling.

In the arrangement of this random sampler considerable variation can be made in the characteristics of the conveyor belt. Depending upon the particular fruit, vegetable or other item to be sampled is the arrangement, location, size and number of the trap doors 51. While a fairly wide range of articles can be sampled at random with but a single belt, if there is a wide physical variation in the nature of the articles handled or if the size of the desired sample varies a great deal, then it is fairly simple to replace one conveyor belt with another one, the second having appropriate trap doors for the desired sampling of the newer commodity.

What is claimed is:

1. A random sampler for fruit and the like comprising a frame extending from a loading location to a spaced sampling location, a horizontal planar supporting table on and extending longitudinally along said frame, means defining an opening through said table at said sampling location and extending substantially across said table, a flat conveyor belt web of substantially uniform thickness throughout and having an upper run, means defining in said conveyor belt web a plurality of trap doors arranged in diagonal array extending substantially across said belt, means for mounting said conveyor belt web on said frame with the upper run of said conveyor belt web resting on and movable over said table from said loading location to said sampling location and with said trap doors in longitudinal alignment with and adapted to pass over said opening in succession, and means on said frame beneath said opening for receiving fruit and the like dropping from said conveyor belt web past said trap doors and through said opening.

2. A random sampler as in claim 1 in which a plurality of said trap doors are provided by cuts through said conveyor belt web at predetermined locations diagonally spaced apart longitudinally and crosswise of said conveyor belt.

3. A random sampler as in claim 1 including means on said frame for changing the size of said table opening in the direction of advance of said conveyor belt.

4. A random sampler as in claim 1 including means on said conveyor belt providing a low, flexible barrier extending diagonally crosswise of said belt adjacent the free edge of said trap door.

5. A random sampler as in claim 1 in which a transverse cut defining said trap door is disposed diagonally of said belt.

References Cited

UNITED STATES PATENTS

| | | | |
|---|---|---|---|
| 1,423,890 | 7/1922 | Warner | 73—421 |
| 2,359,641 | 10/1944 | Harlow | 73—421 |
| 2,367,397 | 1/1945 | Harlow | 73—421 |
| 3,302,769 | 2/1967 | Platzer et al. | 73—423 XR |
| 3,111,034 | 11/1963 | Hostetler | 73—421 |

LOUIS R. PRINCE, Primary Examiner

H. C. POST III, Assistant Examiner

U.S. Cl. X.R.

198—184